United States Patent [19]

Meyer

[11] 4,361,386
[45] Nov. 30, 1982

[54] ELECTROLYTIC DISPLAY CELL

[75] Inventor: Robert Meyer, St. Nazaire les Eymes, France

[73] Assignee: Commissariat A L'Energie Atomique, Paris, France

[21] Appl. No.: 194,130

[22] Filed: Oct. 6, 1980

[30] Foreign Application Priority Data

Oct. 17, 1979 [FR] France .................................. 79 25788

[51] Int. Cl.$^3$ ................................................ G02F 1/29
[52] U.S. Cl. ..................................... 350/363; 350/357; 350/358
[58] Field of Search ......................... 350/357, 358, 363

[56] References Cited

U.S. PATENT DOCUMENTS 4,073,570 2/1978 Korinek .............................. 350/357

Primary Examiner—William L. Sikes
Assistant Examiner—Leon Scott, Jr.
Attorney, Agent, or Firm—Pearne, Gordon, Sessions, McCoy & Granger

[57] ABSTRACT

Electrolytic display cell comprising, between two electrodes of appropriate shapes, a liquid electrolyte containing metal ions, wherein said electrolyte comprises ions of a first metal and ions of a second metal, said first and second metals having similar redox potentials.

Process for increasing the storage life of the display in a liquid electrolyte cell containing ions of a first metal, wherein ions of a second metal are added, the first and second metals having similar redox potentials.

6 Claims, No Drawings

ELECTROLYTIC DISPLAY CELL

BACKGROUND OF THE INVENTION

The present invention relates to an electrolytic display cell and to a process for increasing the storage life of the display. It is intended for use in optoelectronics and particularly the display of alphanumeric characters.

An electrolytic display cell comprises an electrolyte containing a metal salt inserted between an appropriately shaped electrode and a conterelectrode both of which are connected to a power supply able to bring the electrode to a given potential in order to bring about therein either the deposition of a metal layer by electrochemical reduction (display phase), or the re-dissolving of this layer by electrochemical oxidation (erasure phase).

One of the major problems caused by such devices is the life of the cell. Maximum stability of the substances present is necessary to obtain a long life.

The stability of the electrolyte can be obtained by using an organic solvent and a salt, which is such that secondary reactions which may appear at the end of dissolving are reversible, so that the product produced by the secondary reactions decomposes again into its initial components. The composition of the electrolyte then remains substantially unchanged. The salt is generally a metal halide, particularly silver bromide or iodide.

However, there is also a difficulty linked with the duration of the storage phenomenon of the displayed symbols. A storage time of approximately 10 minutes can be obtained with such electrolytes (e.g. with silver iodide). However, a problem occurs in connection with the maintainance of this time following display "refreshing" cycles.

As is known this consists of an erasure and re-writing operation carried out as quickly as possible in order to regenerate the display contrast. The period of time between two refreshing operations is dependent on the ability of the cell to store the display when excitation is at an end. It rises with an increase in the storage time. A period of 10 minutes would appear to constitute a minimum in applications to clocks and watches, so that power consumption remains limited.

To give a better understanding of the difficulties which may occur during such a refreshing operation it is necessary to briefly describe the phenomena leading to a deterioration of the storage. These phenomena are of two different types, depending on whether they relate to excess erasure or a lack of stability of the structure of the metal film. During an excess of erasure a large quantity of halogen (iodine for example) is formed in the vicinity of an erased segment. If the latter is immediately re-written the halogen which has not had time to diffuse dissolves part of the silver which has just been deposited, leading to a reduction in the contrast. The reduction in the optical properties of the silver film (and particularly its absorption) is linked with a development of the structure of the film during the storage period. Whereas initially the structure was monocrystalline and very absorbent for optimum deposition conditions it develops towards an increasingly less absorbent filamentary form. Thus, the contrast is progressively reduced to zero. Moreover, for a filamentary surface, during the dissolving of the last silver filaments, iodine simultaneously forms on the remainder of the film surface. Thus, the iodine quantity formed is greater than in the case where the structure is microcrystalline. Finally, if an erasure has been inadequate the metal layer develops more rapidly in the following writing cycle because the undissolved silver grains serve as recrystallization nuclei, so that the storage progressively deteriorates.

Satisfactory operation can only be obtained if it is possible to perfectly redissolve the silver film without the iodine quantity formed being too great. For this purpose it is necessary that the development of the film structure has been sufficiently small, i.e. that it is stable.

BRIEF SUMMARY OF THE INVENTION

The present invention makes it possible to solve this problem. To this end the invention provides for the addition of a second metal salt to the electrolyte. The metal of the second salt being depositable at the same time as the metal of the first salt during the display phase. The deposited metal layer then contains the two metals and surprisingly is more stable than the layer obtained with a single metal, whilst the storage time is increased.

More specifically the present invention relates to an electrolytic display cell comprising, between two electrodes of appropriate shapes, a liquid electrolyte containing metal ions, wherein said electrolyte comprises ions of a first metal and ions of a second metal, said first and second metals having similar redox potentials.

The invention also relates to a process for increasing the storage life of the display in a liquid electrolyte cell containing ions of a first metal, wherein ions of a second metal are added, the first and second metals having similar redox potentials.

DETAILED DESCRIPTION OF THE PREFERRED EMBODIMENTS

Preferably the first metal is silver. Gold and copper have redox potentials relatively close to that of silver and are therefore suitable for depositing therewith.

The redox potential of gold is higher than that of silver and will therefore be deposited more easily and will dissolve more difficulty than the latter. Thus, during an erasure pulse gold and silver are deposited on the counterelectrode. During the following writing pulse silver is re-dissolved more easily because it has a lower redox potential than gold and there is an important reserve thereof. It could therefore be feared that the gold would gradually disappear from the electrolyte and would accumulate on the counterelectrode, but in reality this phenomenon disappears very rapidly. Immediately following the filling of the cell there is a chemical displacement of a fraction of the silver from the counterelectrode by a part of the gold contained in the electrolyte:

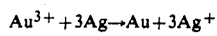

$$Au^{3+} + 3Ag \rightarrow Au + 3Ag^+$$

Once the counterelectrode is covered with a thin gold film the state of equilibrium is obtained and the operation of the display remains stable.

Copper has a lower redox potential than silver, so that it is deposited more difficulty and dissolves more easily than the latter. The overvoltage necessary for the nucleation of the first silver layers permits the simultaneous deposition of copper during the writing phase. As copper is also easier to dissolve than silver it does not accumulate on the counterelectrode and the electrolyte composition remains stable.

According to the invention it is possible to use in exemplified manner an electrolyte having one of the two following compositions:

| 1st salt | Ag I: | 10 g/l | Ag I: | 40 g/l |
|---|---|---|---|---|
| 2nd salt | CuI or CuBr$_2$ | 2.5 g/l | Au I$_3$: | 2.5 g/l |
| | Na I: | 180 g/l | Na I: | 180 g/l |
| Methyl alcohol | | 67% | | |
| Acetonitrile | | 33% | | |

This novel electrolyte makes it possible to increase the storage time of electrolytic display cells in a ratio of 2. Erasure after 10 minutes' storage is obtained without the iodine formation impairing the contrast between the following re-writing.

The invention described hereinbefore is preferably used in electrolytic display cells using an absorbent metallic deposit, like that described in French Patent Application No. 76/15103 filed on May 19th 1976 by the present Applicant. However, it is also applicable to cells with a reflecting metallic deposit and as described in numerous documents, particularly French Pat. No. 1 228 105 of Feb. 3rd 1959, U.S. Pat. Nos. 3,245,313 of Apr. 12th 1966 and 3,626,410 of Dec. 7th 1971 and French Patent Application No. 2 131 993 of Feb. 29th 1972.

What is claimed is:

1. An electrolytic display cell comprising, between two electrodes of appropriate shapes, a liquid electrolyte containing metal ions, wherein said electrolyte comprises ions of a first metal and ions of a second metal, said first and second metals having similar redox potentials.
2. An electrolytic display cell according to claim 1, wherein the first metal is silver.
3. An electrolytic display cell according to claim 2, wherein the second metal is copper.
4. An electrolytic display cell according to claim 2, wherein the second metal is gold.
5. An electrolytic display cell according to claim 1, wherein the metal layer deposited on one of the electrodes during the display is an absorbent thin film.
6. A process for increasing the storage life of the display in a liquid electrolyte cell containing ions of a first metal, wherein ions of a second metal are added, the first and second metals having similar redox potentials.

* * * * *